(12) United States Patent
Li et al.

(10) Patent No.: US 8,378,993 B2
(45) Date of Patent: Feb. 19, 2013

(54) CAPACITIVE TOUCH DISPLAY PANEL

(75) Inventors: Ling Li, Hualien (TW); Ying-Hui Chen, Taoyuan (TW); Chia-Lin Liu, Taichung County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 399 days.

(21) Appl. No.: 12/683,439

(22) Filed: Jan. 7, 2010

(65) Prior Publication Data

US 2011/0096017 A1    Apr. 28, 2011

(30) Foreign Application Priority Data

Oct. 27, 2009   (TW) ............................... 98136277 A

(51) Int. Cl.
*G06F 3/045* (2006.01)

(52) U.S. Cl. .................... 345/174; 345/173; 345/179

(58) Field of Classification Search ........... 345/173–179
See application file for complete search history.

(56) References Cited

U.S. PATENT DOCUMENTS

2008/0007534 A1   1/2008   Peng
2008/0122802 A1*  5/2008   Furuhashi et al. ............ 345/174

FOREIGN PATENT DOCUMENTS

CN   101403830 A   4/2009
TW   M344522      11/2008

* cited by examiner

*Primary Examiner* — Kevin M Nguyen
*Assistant Examiner* — Cory Almeida
(74) *Attorney, Agent, or Firm* — Winston Hsu; Scott Margo

(57) ABSTRACT

A capacitive touch display panel includes a first substrate, a second substrate, an opaque pattern, a plurality of transparent conductive sensor pads, and a plurality of non-transparent conductive patterns. The first substrate and the second substrate are disposed oppositely. The transparent conductive sensor pads are disposed on the second substrate. The non-transparent conductive patterns are disposed on the second substrate, and the non-transparent conductive patterns and the transparent conductive sensor pads are electrically connected and overlapping. The conductivity of the non-transparent conductive patterns is higher than that of the transparent conductive sensor pads, and the non-transparent conductive patterns are corresponding to the opaque pattern.

13 Claims, 5 Drawing Sheets

CAPACITIVE TOUCH DISPLAY PANEL

BACKGROUND OF THE INVENTION

1. Field of the Invention

The present invention relates to a capacitive touch display panel, and more particularly, to a capacitive touch display panel with low impedance and high aperture ratio.

2. Description of the Prior Art

In the current market of diverse consumer electronics, touch panels are broadly applied as communications interfaces between human and machine in the portable information products such as mobile phones, Global Positioning System (GPS), and digital video/audio players. Since the consumer electronics tend to be thinner and more light-weighted, traditional input equipments including keyboard and mouse, which take more space, are gradually replaced by touch panels, and touch panels have become one of the key components.

However, it is difficult for large-sized touch display panels to identify the input signals correctly, which results from a high impedance of the sensor pads made of transparent conductive materials. Thus, to solve the above-mentioned issue becomes desirable.

SUMMARY OF THE INVENTION

It is therefore an objective of the present invention to provide a capacitive touch display panel to solve the conventional technical problem.

The present invention provides a capacitive touch display panel. The capacitive touch display panel includes a first substrate, a second substrate, an opaque pattern, a plurality of transparent conductive sensor pads, and a plurality of non-transparent conductive patterns. The first substrate and the second substrate are disposed oppositely to each other. The transparent conductive sensor pads are disposed on the second substrate. The non-transparent conductive patterns are disposed on the second substrate. The non-transparent conductive patterns and the transparent conductive sensor pads are electrically connected and overlapping with each other. An electrical conductivity of the non-transparent conductive patterns is higher than that of the transparent conductive sensor pads. The non-transparent conductive patterns are corresponding to the opaque pattern.

Furthermore, the present invention provides a capacitive touch display panel, which includes an opaque pattern, a plurality of transparent conductive sensor pads, and a plurality of non-transparent conductive patterns. The non-transparent conductive patterns and the transparent conductive sensor pads are electrically connected and overlapping with each other. An electrical conductivity of the non-transparent conductive patterns is higher than that of the transparent conductive sensor pads. The non-transparent conductive patterns are corresponding to the opaque pattern.

The capacitive touch display panel of the present invention includes the transparent conductive sensor pads and the non-transparent conductive patterns. The electrical conductivity of the non-transparent conductive patterns is higher than that of the transparent conductive sensor pads, thus the electrical conductivity of the transparent conductive sensor pads can be enhanced. Additionally, the non-transparent conductive patterns are disposed in the non-transparent region formed by the opaque pattern so that the aperture ratio will not be adversely affected.

These and other objectives of the present invention will no doubt become obvious to those of ordinary skill in the art after reading the following detailed description of the preferred embodiment that is illustrated in the various figures and drawings.

DETAILED DESCRIPTION

Certain terms are applied throughout the following description and claims to refer to particular components. As those of ordinary skill will appreciate, manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ".

Figure 1:
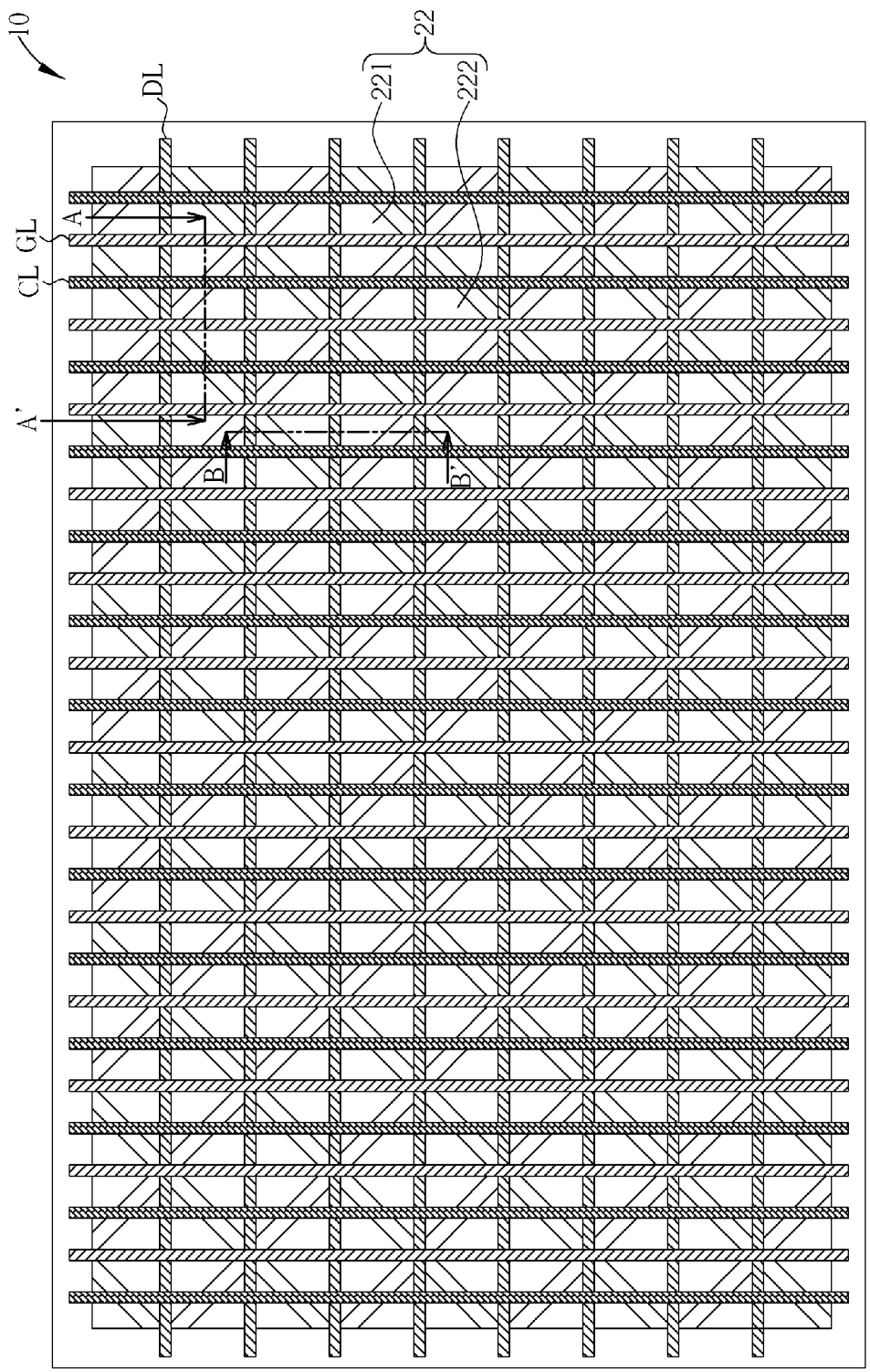
FIGS. 1 to 3 are schematic diagrams showing a capacitive touch display panel according to a preferred embodiment of the present invention.
Figure 2:
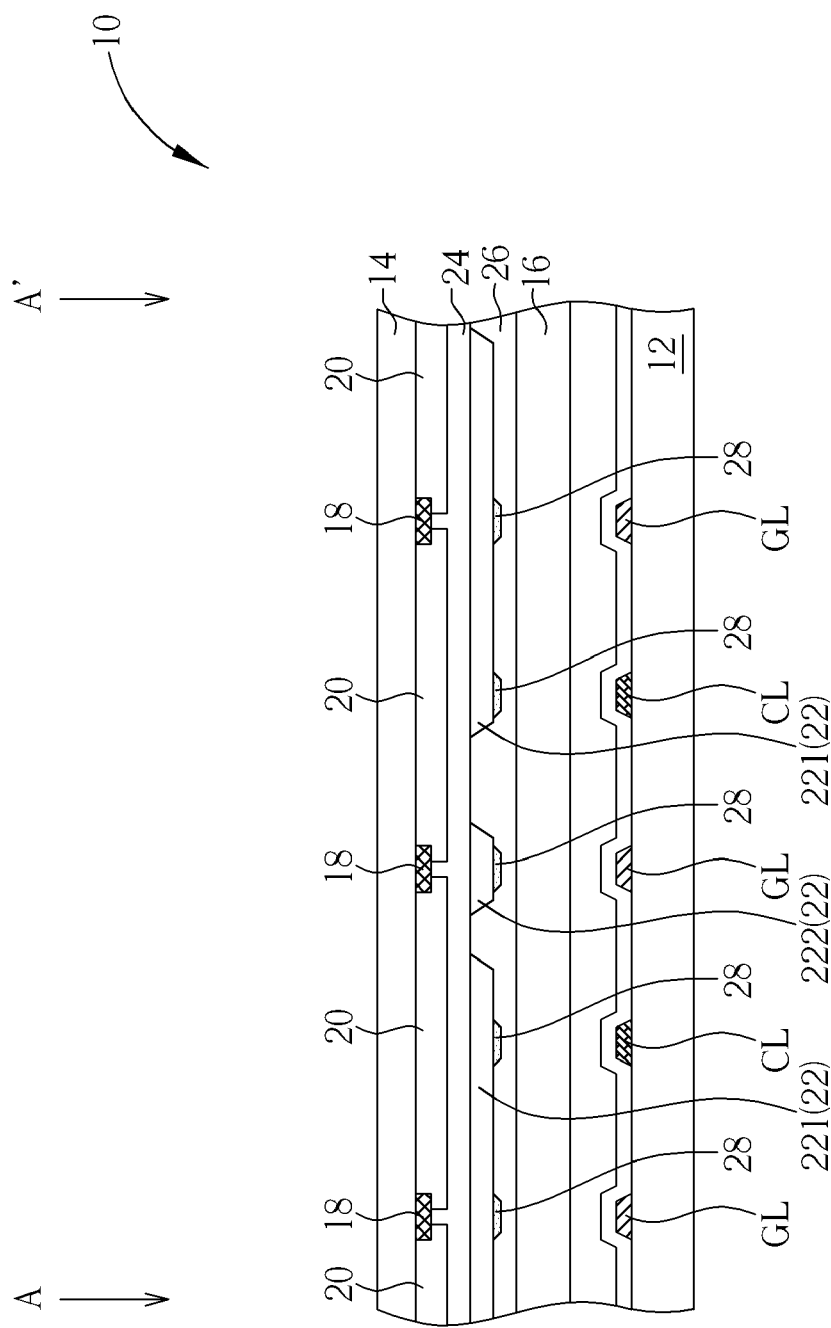
Figure 3:
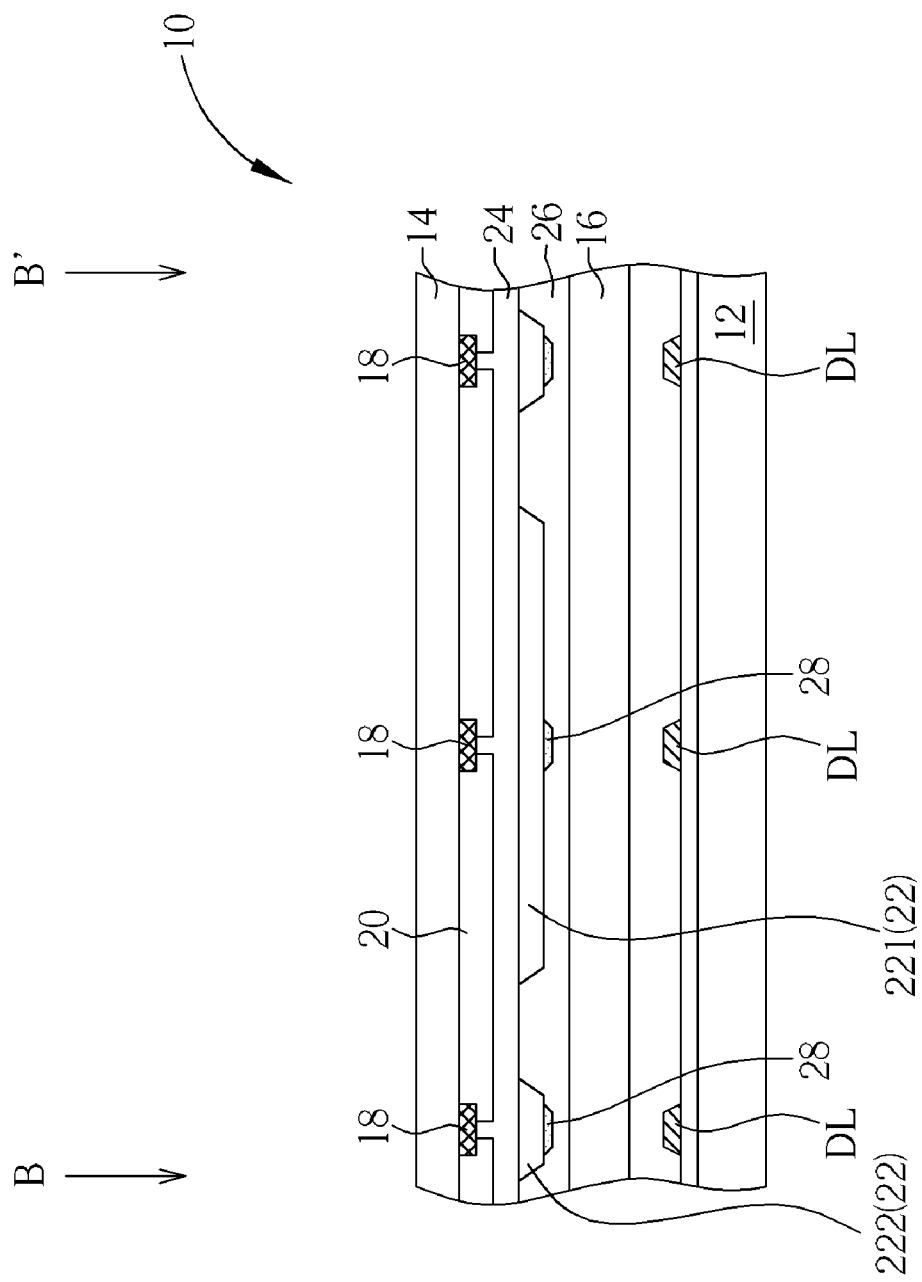

FIGS. 1 to 3 are schematic diagrams showing a capacitive touch display panel according to a preferred embodiment of the present invention. FIG. 1 is a bottom-view, FIG. 2 is a cross-sectional view along A to A' of FIG. 1, and FIG. 3 is a cross-sectional view along B to B' of FIG. 1. In order to highlight the characteristics of the present invention, some components are not shown in FIG. 1. As shown in FIGS. 1 to 3, a capacitive touch display panel 10 of the present embodiment includes a first substrate 12, a second substrate 14 opposing to the first substrate 12, and a liquid crystal layer 16 disposed between the first substrate 12 and the second substrate 14. The first substrate 12 is an array substrate, also called as a thin-film transistor (TFT) substrate, and the second substrate 14 is a color filter (CF) substrate. Essential components of display panels such as a plurality of gate lines GL, a plurality of data lines DL, and a plurality of common lines CL are disposed on the first substrate 12 along with TFTs, storage capacitors, and pixel electrodes (not shown in the drawing). In addition, a black light-shielding pattern (also referred to as black matrix pattern) 18, a color filter 20, a plurality of transparent conductive sensor pads 22, and common electrodes (not shown in the drawing) are disposed on the second substrate 14. The black light-shielding pattern 18, the color filter 20, and the transparent conductive sensor pads 22 are disposed on a side of the second substrate 14 that faces the first substrate 12. The black light-shielding pattern 18 and the color filter 20 are covered by a first overcoat layer 24. The transparent conductive sensor pads 22 are disposed on the first overcoat layer 24 and the transparent conductive sensor pads 22 are further covered by a second overcoat layer 26. The transparent conductive sensor pads 22 serve as an electrode of a touch capacitor, which forms a capacitor along with fingers or other input equipments. The transparent conductive sensor pads 22 include a plurality of first transparent conductive sensor pads 221 and a plurality of second transparent conductive sensor pads 222. The first transparent conductive sensor pads 221 and the second transparent conductive sensor pads 222 are formed by the same transparent conductive layer. The first transparent conductive sensor pads 221 are disposed along a first direction, such as a Y-direction and the second transparent conductive sensor pads 222 are disposed along a second direction, such as an X-direction. The transparent conductive sensor pads 221 of the same column or the second transparent conductive sensor pads 222 of the same row are electrically connected to each other by bridge electrodes (not shown in the drawing). Through the layout of the first transparent conductive sensor pads 221 and the second transparent conductive sensor pads 222, a touch input signal generated by touch input can be transmitted to sensor circuit through the first transparent conductive sensor pads 221, which are arranged along the first direction, and through the second transparent conductive sensor pads 222, which are arranged along the second direction, so that the input position can be determined.

The capacitive touch display panel 10 has both functions of display and touch input. In order to prevent the aperture ratio from being influenced, the transparent conductive sensor pads 22 have to be made of transparent conductive materials such as indium tin oxide (ITO). However, the electrical conductivity will be adversely affected due to a high impedance of the transparent conductive materials. Thus, as the size of the touch display panels increases, it will be more difficult for the sensor circuit to identify if there is any input signal. In light of the above-mentioned technical problems, the present embodiment proposes the capacitive touch display panel 10, which has a plurality of non-transparent conductive patterns 28 disposed on the second substrate 14. The non-transparent conductive patterns 28 and the transparent conductive sensor pads 22 are electrically connected to each other and the non-transparent conductive patterns 28 and the transparent conductive sensor pads 22 are partially overlapping with each other. That is, an area of each of the non-transparent conductive patterns 28 is smaller than that of each of the transparent conductive sensor pads 22 and the non-transparent conductive patterns 28 are located in a region included by the transparent conductive sensor pads 22. Moreover, via selecting a conductive material with an impedance, which is lower than that of the transparent conductive sensor pads 22, as a material for the non-transparent conductive patterns 28, an overall impedance of the transparent conductive sensor pads 22 can be decreased accordingly. In other words, the electrical conductivity of the non-transparent conductive patterns 28 is higher than that of the transparent conductive sensor pads 22 so that the capacitive touch input can be realized on large-sized display panels.

Within the capacitive touch display panel 10, the gate lines GL, the data lines DL, the common lines CL, and the TFTs disposed on the first substrate 12 as well as essential components such as the black light-shielding pattern 18 disposed on the second substrate 14 are a part of the opaque pattern. That is, while looking at the capacitive touch display panel 10, the components mentioned above are located in the non-transparent region. Therefore, the non-transparent conductive patterns 28, used for enhancing the electrical conductivity, are corresponding to at least one of the gate lines GL, the data lines DL, the common lines CL, and the black light-shielding pattern 18. That is, the non-transparent conductive patterns 28 are disposed in the non-transparent region formed by the opaque pattern including the gate lines GL, the data lines DL, the common lines CL, and the black light-shielding pattern 18. As a result, the electrical conductivity of the transparent conductive sensor pads 22 can be enhanced by the non-transparent conductive patterns 28 without affecting the aperture ratio. It is to be noted that the relative position of the non-transparent conductive patterns 28 and the transparent conductive sensor pads 22 is not limited to that illustrated in FIGS. 2 and 3. For example, the non-transparent conductive patterns 28 may be disposed between the second substrate 14 and transparent conductive sensor pads 22.

Figure 4:
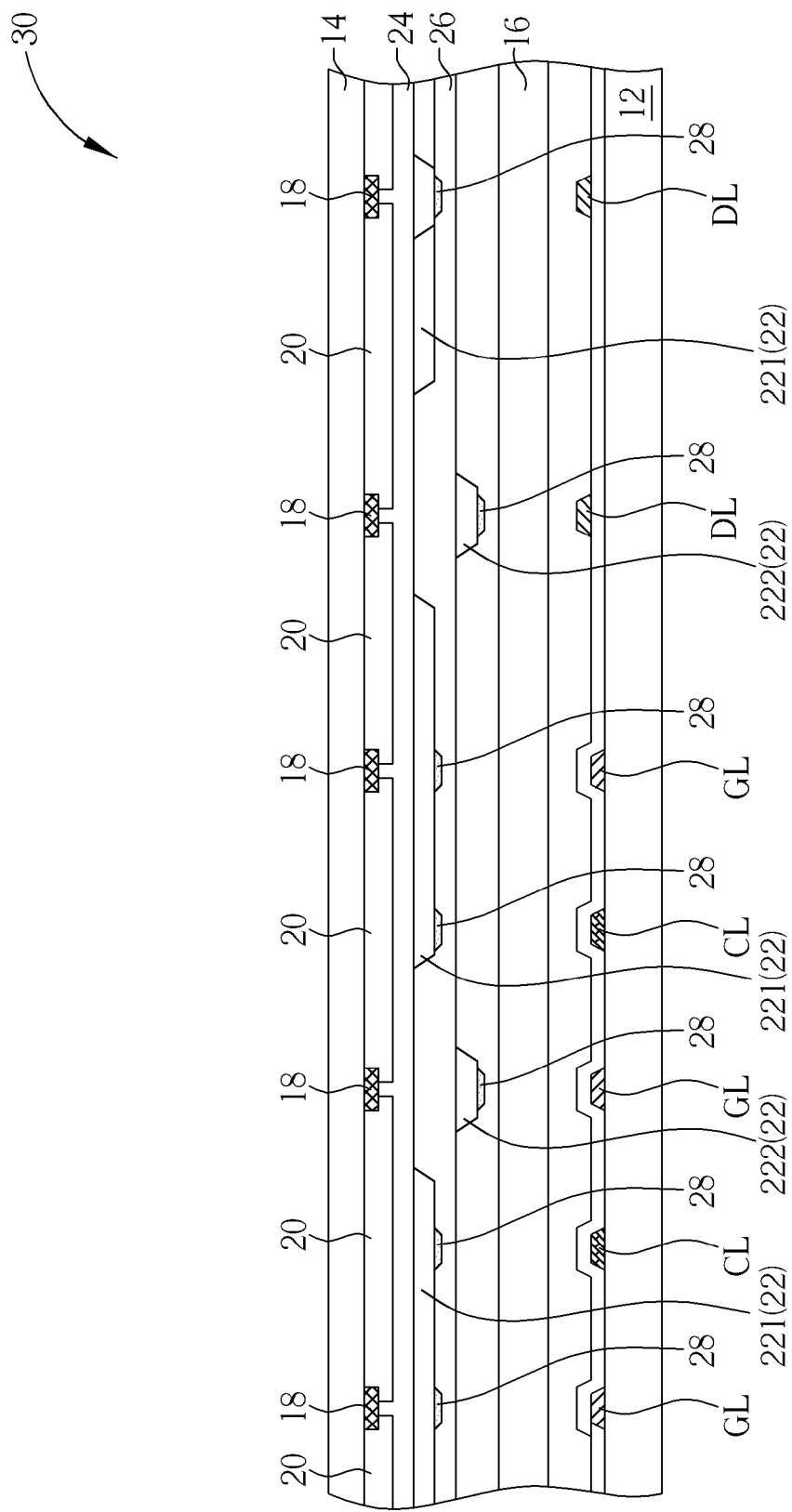
FIG. 4 is a schematic diagram showing a capacitive touch display panel according to another preferred embodiment of the present invention.

To emphasize the dissimilarities among different embodiments, identical components are denoted by identical numerals and will not be redundantly described. FIG. 4 is a schematic diagram showing a capacitive touch display panel according to another preferred embodiment of the present invention. As shown in FIG. 4, the difference between the present embodiment and the embodiment described above lies in that the first transparent conductive sensor pads 221 and the second transparent conductive sensor pads 222 of the capacitive touch display panel 30 are not made of the same transparent conductive layer in the present embodiment. Therefore, the first transparent conductive sensor pads 221 of the same column or the second transparent conductive sensor pads 222 of the same row do not require bridge electrodes to be electrically connected to each other. However, the non-transparent conductive patterns, used for enhancing the electrical conductivity, are disposed in the non-transparent region formed by the opaque pattern including the gate lines GL, the data lines DL, the common lines CL, and the black light-shielding pattern 18 to prevent the aperture ratio from being adversely affected.

Figure 5:
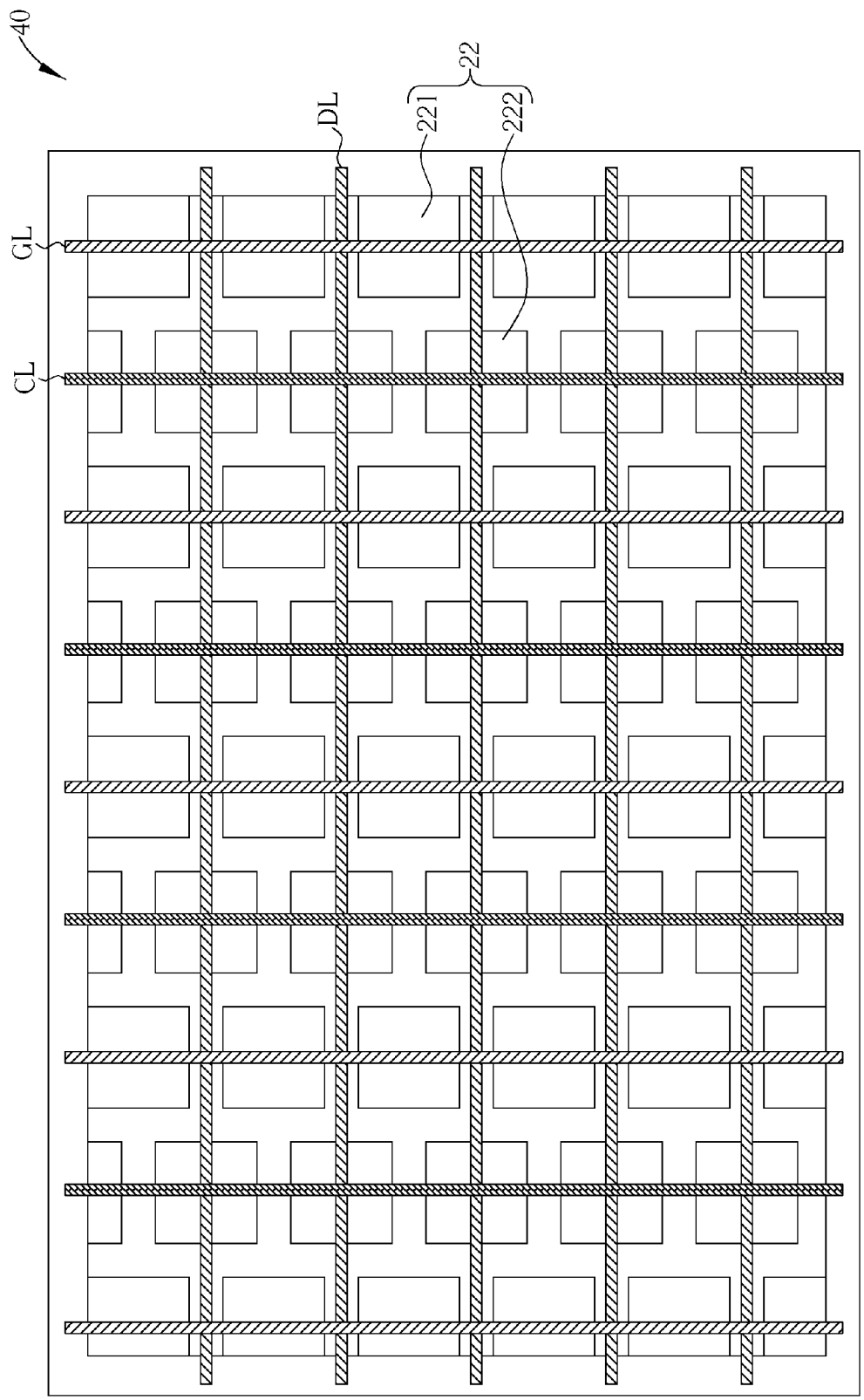
FIG. 5 is a schematic diagram showing a capacitive touch display panel according to yet another preferred embodiment of the present invention.

FIG. 5 is a schematic diagram showing a capacitive touch display panel according to yet another preferred embodiment of the present invention. As shown in FIG. 5, different from the transparent conductive sensor pads 22 of rhombus shape described in the previous embodiments, transparent conductive sensor pads 22 of rectangular shape are used for the capacitive touch display panel 40. Accordingly, the relative position of the transparent conductive sensor pads 22 and the gate lines GL, the common lines CL and the data lines DL will become different. However, the non-transparent conductive patterns, used for enhancing the electrical conductivity, are disposed in the non-transparent region formed by the opaque pattern including the gate lines GL, the data lines DL, the common lines CL, and the black light-shielding pattern to prevent the aperture ratio from being adversely affected.

In summary, the present invention provides the non-transparent conductive patterns with a low impedance to enhance the electrical conductivity of the transparent conductive sensor pads so that a touch sensitivity of the capacitive touch display panel can be improved. Furthermore, due to that the non-transparent conductive patterns are disposed in the non-transparent region formed by the opaque pattern including the gate lines, the data lines, the common lines and the black light-shielding pattern, the aperture ratio will not be adversely affected.

Those skilled in the art will readily observe that numerous modifications and alterations of the device and method may be made while retaining the teachings of the invention.

What is claimed is:
1. A capacitive touch display panel, comprising:
an opaque pattern;
a plurality of transparent conductive sensor pads; and
a plurality of non-transparent conductive patterns, the plurality of non-transparent conductive patterns and the plurality of transparent conductive sensor pads being directly connected and partially overlapping with each other, wherein an electrical conductivity of the plurality of non-transparent conductive patterns is higher than an electrical conductivity of the plurality of transparent conductive sensor pads, and the plurality of non-transparent conductive patterns are corresponding to the opaque pattern.

2. The capacitive touch display panel of claim 1, further comprising a first substrate and a second substrate disposed oppositely to the first substrate.

3. The capacitive touch display panel of claim 2, wherein the first substrate is an array substrate and the second substrate is a color filter (CF) substrate.

4. The capacitive touch display panel of claim 2, wherein the plurality of transparent conductive sensor pads are disposed on the second substrate.

5. The capacitive touch display panel of claim 2, wherein the plurality of non-transparent conductive patterns are disposed on the second substrate.

6. The capacitive touch display panel of claim 2, wherein the plurality of transparent conductive sensor pads and the plurality of non-transparent conductive patterns are disposed on a side of the second substrate that faces the first substrate.

7. The capacitive touch display panel of claim 1, wherein the opaque pattern comprises a gate line.

8. The capacitive touch display panel of claim 1, wherein the opaque pattern comprises a data line.

9. The capacitive touch display panel of claim 1, wherein the opaque pattern comprises a common line.

10. The capacitive touch display panel of claim 1, wherein the opaque pattern comprises a black light-shielding pattern.

11. The capacitive touch display panel of claim 1, wherein the plurality of transparent conductive sensor pads comprises a plurality of first transparent conductive sensor pads and a plurality of second transparent conductive sensor pads, the plurality of first transparent conductive sensor pads are disposed along a first direction and the plurality of second transparent conductive sensor pads are disposed along a second direction.

12. The capacitive touch display panel of claim 11, wherein the plurality of first transparent conductive sensor pads and the plurality of second transparent conductive sensor pads are a same transparent conductive layer.

13. The capacitive touch display panel of claim 11, wherein the plurality of first transparent conductive sensor pads and the plurality of second transparent conductive sensor pads are different transparent conductive layers.

\* \* \* \* \*